United States Patent Office 3,605,700
Patented Sept. 20, 1971

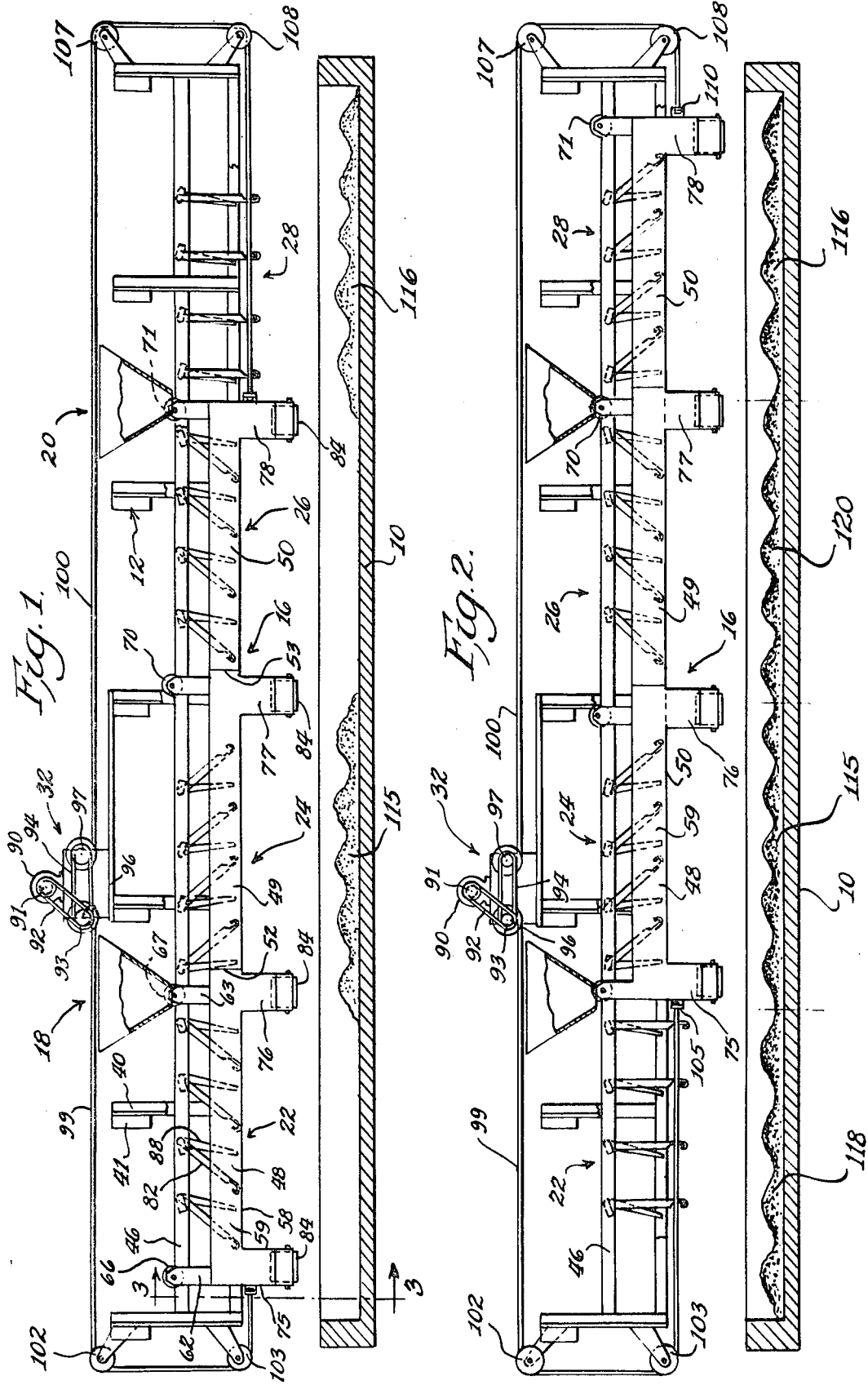

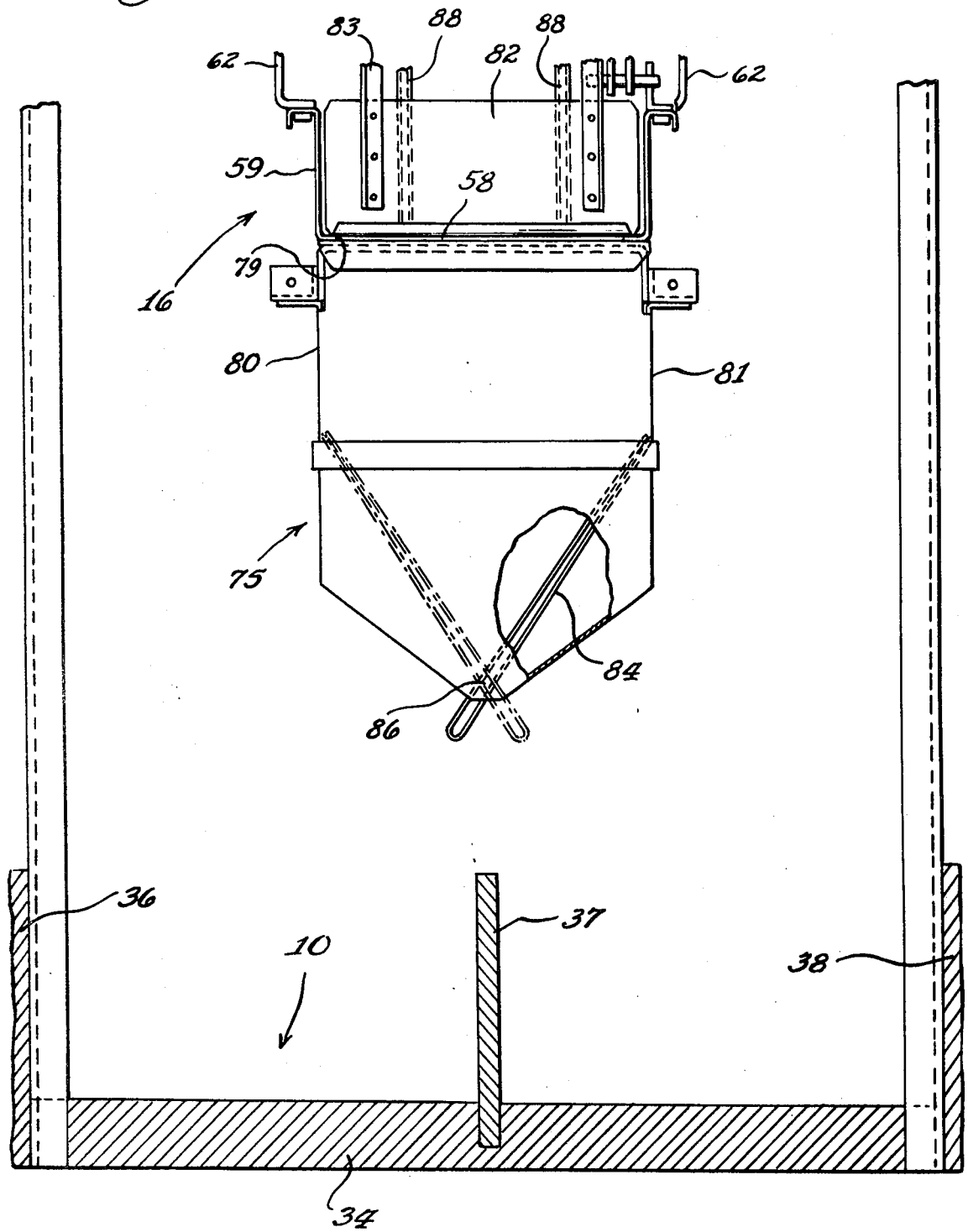

3,605,700
SWEEP SHUTTLE FEEDER
Allen K. Gillette, Belvidere, Ill., assignor to
Starline Inc.
Filed May 11, 1970, Ser. No. 36,062
Int. Cl. A01k 39/00; B65g 25/04
U.S. Cl. 119—56R
7 Claims

ABSTRACT OF THE DISCLOSURE

A sweep shuttle animal feeder having the capability of delivering more than two feed lots or rations to a longitudinally partitioned feed bunk including a feed trough having four discharge chutes which reciprocates above the feed bunk with at least two feed supply stations above the feed trough to deposit feed in the trough with the feed supply stations being spaced a distance approximately equal to the discharge chute spacing, there being provided a set of sweep means on each side of each of the feed supply stations. The sweep means of the sweep sets adjacent one side of each of the feed supply stations being constructed to discharge feed through two of the discharge chutes while the trough moves in one direction, and the sweep means associated with the other side of each of the supply stations being effective to discharge feed from the other two discharge chutes while the trough moves in the opposite direction. There is further provided a selectively positionable diverter panel in each of the feed discharge chutes on the trough to selectively direct feed to either side of the partition in the bunk, which gives the entire feeder the capability of depositing four separate feed lots in the feed bunk.

BACKGROUND OF THE PRESENT INVENTION

The present invention relates to a sweep shuttle feeder of the type disclosed in the Ferris et al. application, Ser. No. 829,933, filed June 3, 1969, assigned to the assignee of the present invention. In the Ferris et al. application a shuttle feeder is disclosed that includes a plurality of sweep means on each side of a central feeder station with each of the sweep means including a pivotally mounted panel for engaging the bottom of the trough and sweeping out granular material and a pair of tines mounted on the same axis, but shorter than the panel sweeps for arresting the denser feed materials and assisting their discharge from the trough. Reference should be made to this application for a more detailed explanation of the general function of sweep shuttle feeders.

Prior sweep shuttle feeders have, however, several disadvantages. One such disadvantage is that for each reciprocating trough assembly only a single feed lot may be discharged into the feed bunk. That is, since a single feed supply station is provided for supplying feed to the trough and because of the provision of discharge points only at the ends of the reciprocating trough, it has heretofore generally been possible to deposit only a single feed lot for each cycle of the trough, i.e. forward and return strokes of the trough from one end of the feed bunk to the other. There have been prior attempts to increase the number of feed lots and one of these has included the provision of a partition in the feed bunk which acts in conjunction with angular selectively positionable diverters in the discharge chutes of the feed trough for selectively delivering feed to one side of the bunk partition or the other. Such a construction is shown in the copending application of Michael M. Thyberg, filed Mar. 4, 1970, Ser. No. 16,435, entitled "Sweep Shuttle Feeder With Automatic Lateral Diverter," assigned to the assignee of the present invention.

A further limitation in these prior art constructions is on the length of the feed bunk which may be supplied feed in a given cycle of a single feed trough.

It is a primary object of the present invention to obviate or ameliorate the problems noted above with the prior art sweep shuttle feeders.

SUMMARY OF THE PRESENT INVENTION

A sweep shuttle feeder is provided that can deposit feed in an extended length feed bunk in four separate feed lots or rations. The present device thus has the capability of accommodating feed bunks of greater length while at the same time providing more feed lots than heretofore capable in prior art devices, and which if desired, allows different rations to be deposited at different bunk locations.

The present animal feeder includes a feed bunk having a longitudinal partition throughout the length of the bunk permitting animals to feed without interference from both sides of the bunk and also segregating the feed lots on opposite sides of the bunk. A reciprocating feed trough is provided which in one embodiment includes a plurality of articulated trough sections with four equally spaced discharge chutes. Each of the discharge chutes has a reversible diverter panel that directs feed discharging from the associated chute to one side of the bunk partition or the other. Two feed supply sources are provided that are spaced a distance apart approximately equal to the distance between the discharge chutes on the trough. Positioned on each side of each of the feed supply sources is a set of sweep means that are constructed to discharge feed through the discharge chute as it approaches a particular set of sweep means. Thus with four sets of sweep means being provided, these sets of sweep means on the left-hand side of each of the supply stations will discharge feed through the two discharge chutes approaching these two sets of sweep means as the trough reciprocates in one direction depositing two spaced partial feed lots in the feed bunk, and the sweep means on the right-hand side of each of the supply stations discharge feed through the remaining two approaching discharge chutes in spaced partial feed lots as the trough reciprocates in the opposite direction, thereby depositing two complete feed lots on one side of the bunk partition.

By shifting the diverters to the opposite positions in which they direct feed to the opposite side of the bunk partition, and by repeating the above-described cycle, two additional feed lots may be deposited on the opposite side of the partition. As will be apparent to those skilled in the art, each of the feed lots may be the same or different rations, or different quantities as desired.

An additional advantage of the present animal shuttle feeder construction is that it requires a single trough assembly and a single drive for reciprocating the trough assembly through the necessary movements.

BRIEF DESCRIPTION OF THE DRAWINGS

FIG. 1 is a schematic side elevation view of a sweep shuttle feeder according to one embodiment of the present invention with parts broken away for clarity;

FIG. 2 is a schematic side elevational view of the sweep shuttle feeder shown in FIG. 1 with the trough at its opopsite end of movement;

FIG. 3 is an enlarged transverse section of the feed bunk taken generally along lines 3—3 of FIG. 1 also showing one end of the reciprocating trough.

DETAILED DESCRIPTION OF THE INVENTION

Figure 4:
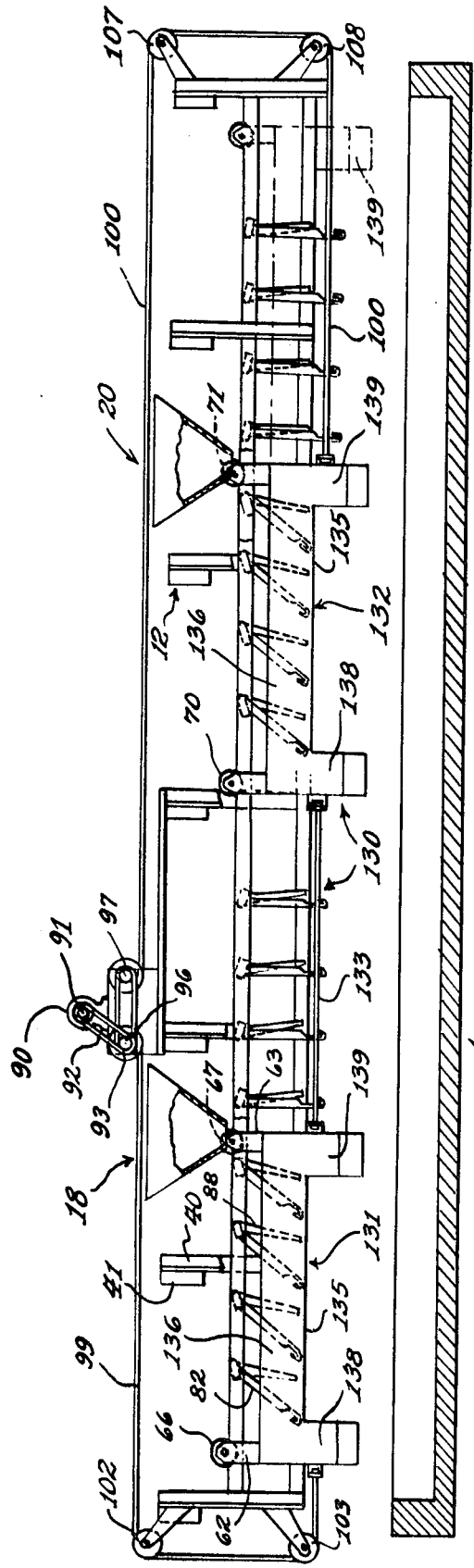
FIG. 4 is a schematic side elevational view of a sweep shuttle feeder according to another embodiment of the present invention with parts broken away for clarity.

Referring to the drawings in greater detail, and particularly FIGS. 1 to 3, the present structure is seen to include a feed bunk 10; a plurality of frame members such as indicated at 12; a feed trough assembly 16 which is mounted for reciprocating movement on the frame 12 above the feed bunk 10; two spaced feed supply sources 18 and 20; four sets of sweep means 22, 24, 26 and 28; and drive means 32 for reciprocating the feed trough 16 from its position at one end of the feed bunk as shown in FIG. 1 to its position at the other end of the feed bunk as shown in FIG. 2.

As shown more clearly in the enlarged view of FIG. 3, the feed bunk 10 is seen to consist of a floor panel 34 with upstanding side walls 36 and 38 and a central partition 39 which extends the entire length of the feed bunk 10.

Frame 12 includes a plurality of upright frame members 40 having cross members 41. Cross members 41 may be carried by different types of supporting members as will be apparent to those skilled in the art.

The cross members 41 support spaced parallel rails 46 from suitable hangers (not shown).

The feed trough 16 is an articulated trough consisting of aligned trough sections 48, 49 and 50 interconnected as at 52, 53 to permit some degree of articulation between the trough sections for the purpose of accommodating for irregularities in the straightness of the tracks or rails 46. Each of the trough sections includes a bottom wall 58 and spaced upstanding side walls 59 as seen more clearly in FIG. 3.

Affixed to the trough section 48 at each end thereof are a pair of brackets 62 and a pair of brackets 63 that carry rollers 66 and 67 at the upper ends thereof that ride on the tracks 46. Similar bracket and roller assemblies, although only a single pair, are provided for each of the trough sections 49 and 50 as indicated at 70 and 71.

The trough sections 48, 49 and 50 have four similar feed discharge chutes 75, 76, 77 and 78. As seen more clearly in FIG. 3, the discharge chutes project beneath apertures in the bottom walls 58 of the trough sections, and each includes side walls 80, 81 and interconnecting walls 82.

Feed discharging from each of the discharge chutes 75 is diverted selectively to either side of partition 39 by a pivotally mounted diverter panel 84 mounted for pivotal movement by pivotal boss 86 in the chute panel members 82. The diverter panel 84 extends substantially the entire width of the chute so that when in the position shown in FIG. 3 it will divert feed from the trough 16 into the feed bunk on the left side of partition 39, and when in the dotted line position will divert feed into the feed bunk on the right side of partition 39. Chutes 75, 76, 77, 78 each have a diverter 84 associated therewith. Suitable manual or automatic controls may be provided for operating the diverters 84 manually or automatically. One such control is disclosed in the copending application of Michael M. Thyberg, cited above.

Each of the sweep means 22, 24, 26 and 28 are identical so that only one set will be described with the understanding that the construction and operation of each set is identical except their direction of orientation. That is, the sweep means 22 and 24 are constructed to rotate away from the supply station 18 while the sweep means 26 and 28 are constructed to rotate away from the supply station 20. Each set of sweep means, such as sweep means 22, includes a plurality of pivotally mounted sweep panels 82 pivotally mounted by brackets 83 (FIG. 3) on a shaft (not shown) supported on the same bracket that supports the rails 46. The sweep panels 82 provide the primary function of arresting movement of the more particulate feed materials. For the purpose of arresting movement of and discharging the denser materials, sweep tines 88 are provided to dig into and arrest the densely packed haylage. Tines 88 are pivotally mounted on the same shafts as the sweep panels 82. For a more detailed discussion of the construction and operation of the sweep panels 82 and the sweep tines 88 reference should be made to the Ferris et al. application Ser. No. 829,993 filed June 3, 1969, assigned to the assignee of the present invention.

The means 32 for reciprocating the trough 16 includes an electric motor 90 having a shaft on which is mounted a drive pulley 91 which receives a drive belt 92 that is drivingly connected to a first drive pulley 93. Belt 92 also drives belt 94 through shaft 96, and belt 94 drives a second drive pulley 97. An idler pulley is provided adjacent each of the drive pulleys 93 and 97 for receiving the outgoing portions 99 and 100, respectively, of the drive cable. The idler pulleys (not shown) are canted slightly from a vertical plane such that the cable can feed off the bottom of the idler pulleys to the top of the drive pulleys without causing climbing or abrasive wear. Thus, the drive unit 32 is constructed to pull cable portion 99, extending over idler pulleys 102 and 103 and interconnected to the left end of trough 16 at 105, for the purpose of pulling the trough 16 in its leftward direction of movement. To effect the right movement of trough 16, cable portion 100, extending around idler pulleys 107 and 108, and connected as at 110 to the right end of the trough 16, is pulled by the cable drive 32.

In operation the feed supply sources 18 and 20 may be filled either with the same feed or different feeds as desired. Assuming the diverters 84 to be in their rearwardly directing position shown in FIG. 3 in which feed is directed to the left side of partition 39, drive 32 may be initiated moving the trough 16 from the position shown in FIG. 1 to the right position shown in FIG. 2. During this movement feed from source 18 is spread over the bottom of trough section 48 and feed from source 20 is spread over the bottom of trough section 50. After the trough 16 reaches the position shown in FIG. 2 drive 32 is reversed and sweep sets 24 and 28 discharge feed through chutes 76 and 78, respectively, into the sections of the feed bunk indicated at 115 and 116, respectively, in FIG. 1. During this return movement of the trough to the position shown in FIG. 1, the trough sections 48 and 50 are again loaded by sources 18 and 20, respectively. After reaching the leftmost position shown in FIG. 1, rightward movement by drive 32 is again initiated but during this cycle of movement the sweep sets 22 and 26 discharge feed through chutes 75 and 77, respectively, into the bunk sections designated generally 118 and 120 in FIG. 2.

To load the opposite side of the bunk, i.e. the right side of partition 39 as viewed in FIG. 3, the diverters 84 are placed in the dotted line position shown in FIG. 3 and the cycle described above is repeated. As discussed above, different feeds may be loaded in the sources 18 and 20 at this time to provide diverse feeds in the different sections of the trough. Thus it is seen that the present device is capable of effecting four feed lots in a single feed bunk, i.e. feed portions 115 and 118 representing one feed lot, feed portions 116 and 120 representing the second feed lot, and the corresponding portions on the opposite side of the partition 39 representing the third and fourth feed lots.

A second embodiment of the present invention is illustrated in FIG. 4 and is seen to be generally similar to the one disclosed in FIGS. 1 to 3 except for the construction of the trough assembly 130.

The trough assembly 130 includes trough sections 131 and 132 interconnected by a cable 133. Each of the trough sections 131, 132 is identical and is seen to include a bottom wall 135 and upstanding side walls 136 with chutes 138 and 139 at each end of the trough sections. The chutes all have diverters similar to the diverters 84 shown with respect to the embodiment disclosed in FIGS. 1 to 3. The chutes 138 and 139 are equally spaced in a manner similar to the FIGS. 1 to 3 embodiment by the proper selection of length of the interconnecting cable 133. Since the operation of the FIG. 5 embodiment construction is substantially the same as that of FIGS. 1 to 3 described in detail above, description thereof is not believed necessary.

I claim:

1. A sweep shuttle animel feeder for supplying feed to a feed bunk, comprising: frame means interconnected trough means reciprocable on said frame means above the feed bunk, said interconnected trough means having four substantially equally spaced discharge stations for supplying feed to said feed bunk, a first supply station for supplying feed to the interconnected trough means, a second supply station for supplying feed to said trough means, said second supply station being spaced from said first supply station a distance approximately equal to twice the distance between the discharge stations on the trough means, sweep means adjacent the supply stations for sweeping feed from the trough means out the discharge stations as the trough means reciprocates, common drive means for reciprocating the trough means as a unit from a first position when one end of the trough means is adjacent one of said supply stations to a second position when the other end of the trough means is adjacent the other supply station.

2. A sweep shuttle animal feeder for supplying feed to a feed bunk as defined in claim 1, wherein said feed bunk has a longitudinal partition, each of said discharge stations on said interconnected trough having a shiftable diverter for directing feed selectively on opposite sides of said partition, means for operating said diverters.

3. A sweep shuttle animal feeder, comprising: a feed bunk, a longitudinal partition in said feed bunk, frame means, a trough assembly reciprocable on said frame means over said feed bunk, said trough assembly having at least four spaced discharge stations permitting feed discharge from the trough assembly to the feed bunk, said discharge stations being substantially equally spaced, a feed diverter at each of said discharge stations to selectively direct feed to either side of said partition, means for operating said diverters, a first supply station for supplying feed to said feed trough assembly, a second supply station for supplying feed to said feed trough assembly, said supply stations being spaced along said feed bunk a distance substantially equal to twice the distance between the feed discharge stations, four sets of sweep means each located adjacent one side of each of the supply stations and each set being operable to sweep feed through one of the discharge stations as the trough assembly is reciprocated, common drive means for said trough assembly for reciprocating said trough assembly from a first position when one end of said trough assembly is adjacent one of said supply stations to a second position when the other end of said trough assembly is adjacent the other supply station, said drive means including means at each end of said trough assembly for pulling the trough assembly.

4. A sweep shuttle animal feeder as defined in claim 3, wherein said trough assembly includes an articulated elongated continuous trough.

5. A sweep shuttle animal feeder as defined in claim 3, wherein said trough assembly includes two spaced trough sections, said sections being spaced a distance substantially equal to the distance between the discharge stations, and means interconnecting said trough sections together for movement as a unit.

6. A sweep shuttle animal feeder for supplying feed to a feed bunk as defined in claim 1, wherein the trough means includes two trough sections of the same length each of which has a discharge station at each of its ends, and in which the trough sections are separated from one another by a distance which is substantially equal to their lengths.

7. A sweep shuttle animal feeder for supplying feed to a feed bunk as defined in claim 6, wherein the drive means includes means for towing the trough means from its leading end in both directions of travel, and in which the interconnected trough sections are connected by a cable by means of which the trailing trough is towed.

References Cited

UNITED STATES PATENTS

| | | | |
|---|---|---|---|
| 3,303,966 | 2/1967 | Bushbom | 119—56 |
| 3,306,261 | 2/1967 | Purdy | 119—56 |
| 3,366,223 | 1/1968 | Haen | 198—67 |
| 3,403,773 | 10/1968 | Loesch et al. | 198—52 |
| 3,419,130 | 12/1968 | Ferris | 198—67 |

ALDRICH F. MEDBERY, Primary Examiner

U.S. Cl. X.R.

198—67